July 14, 1925.  
A. H. CHASE ET AL  
TORPEDO  
Filed Feb. 18, 1922    7 Sheets-Sheet 6

1,546,282

Inventors  
A. H. Chase.  
H. L. Boesch.  
E. E. Holbrook.  
By  
Attorney

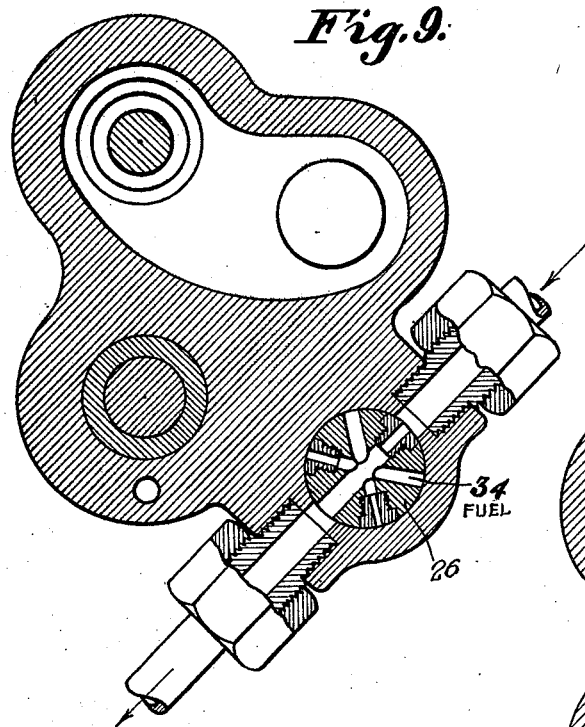
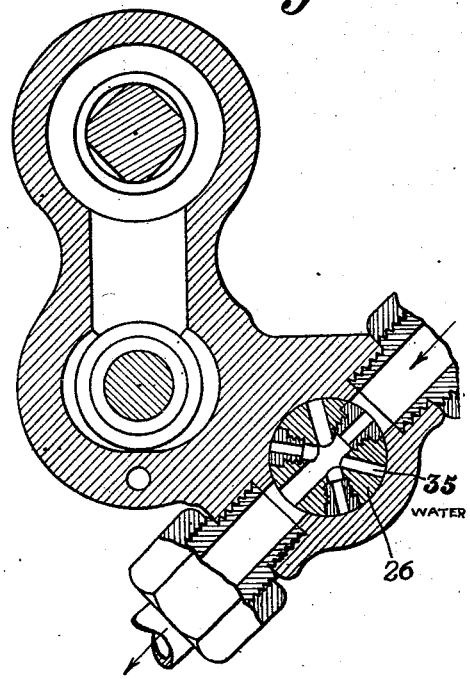
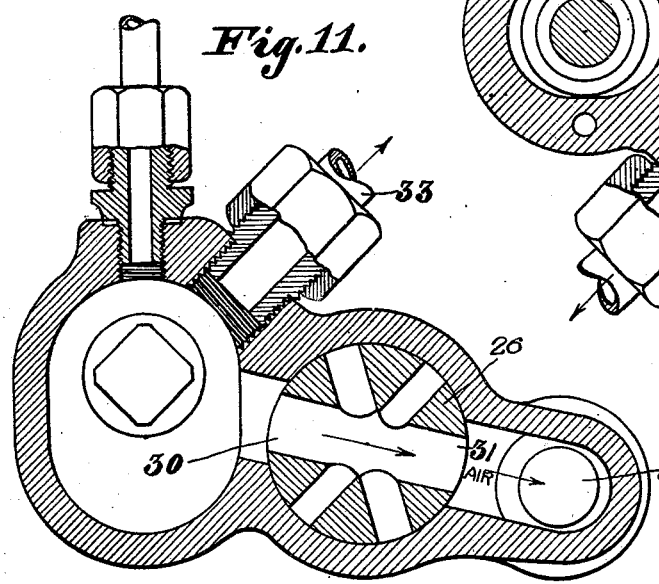

Patented July 14, 1925.

1,546,282

UNITED STATES PATENT OFFICE.

ARTHUR HUTCHINSON CHASE, HARRY LUTHER BOESCH, AND ERNEST EDWARD HOLBROOK, OF WASHINGTON, DISTRICT OF COLUMBIA, ASSIGNORS TO GOVERNMENT OF THE UNITED STATES.

TORPEDO.

Application filed February 18, 1922. Serial No. 537,585.

*To all whom it may concern:*

Be it known that we, ARTHUR HUTCHINSON CHASE, HARRY LUTHER BOESCH, and ERNEST EDWARD HOLBROOK, all citizens of the United States, residing at Washington, District of Columbia, have invented new and useful Improvements in Torpedoes, of which the following is a specification.

This invention relates to torpedoes and more particularly to torpedoes provided with variable speed mechanisms whereby different tactical advantages may be obtained. Sometimes it is desirable to make a short shot at very high speed; at other times a longer shot at a lower speed while in extreme cases a very long distance shot at low speed will answer the purpose.

It is therefore, one of the objects of the present invention to provide a standard Navy automobile torpedo with means whereby its motive power may be set or regulated to accomplish any of these tactical advantages.

A further object is to provide mechanism of the above general character which may be readily installed in torpedoes now in service without making material alteration therein by the substitution of the present or hereinafter described motive means for that heretofore used.

A further object is to provide a mechanism of the type first above mentioned which will be reliable and efficient in use and operation and which will not materially increase the weight of the present torpedo or disarrange the complicated mechanisms now installed in the after-body.

Other objects will be in part obvious and in part hereinafter pointed out in connection with the accompanying sheets of drawings illustrating one of various possible embodiments of the invention and in the several views of which corresponding parts are denoted by similar reference numerals.

Figures 9, 10 and 11 are transverse sectional views taken through the valve for regulating the fuel ingredients prior to their passage to the combustion flask and turbines.

Figure 1:
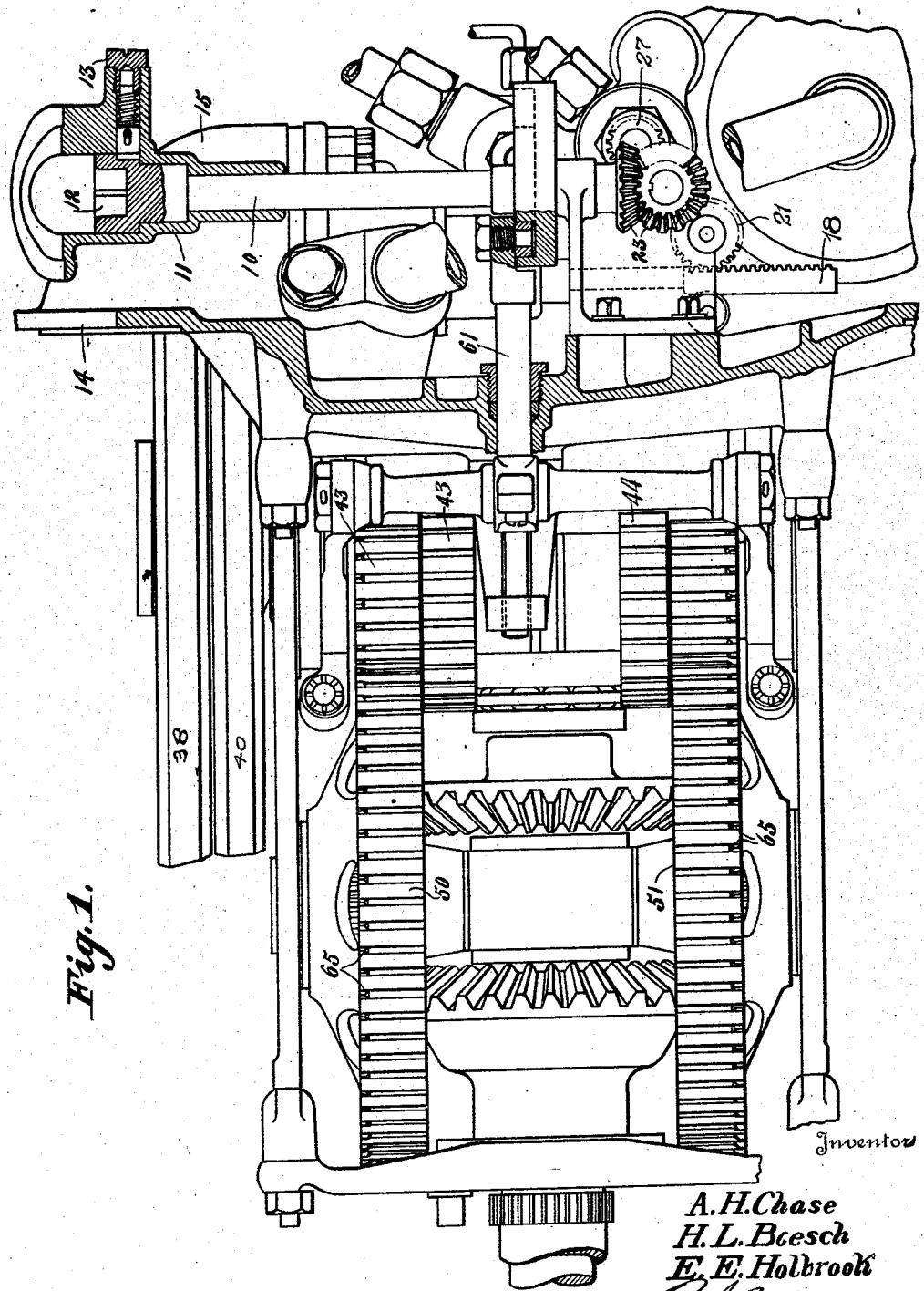
Figure 1 is a side elevational view of such parts of the complete mechanism as will enable one skilled in the art to understand the invention when taken with the other views and the following description.

In the usual torpedo the motive fluid consists of a mixture of gases, obtained by the combustion of a suitable liquid fuel in the presence of one or more cooling agents, which are injected into the combustion chamber for the purpose of reducing the temperature of the motive fluid to a degree which will not cause injury to the motor. The fuel generally employed is alcohol, but kerosene, gasoline or any similar fuel may be used. Combustion of the fuel is supported by oxygen, usually supplied in the form of compressed air. The cooling agent may consist merely of the inert nitrogen supplied with the air, in which case but a small quantity of fuel may be used, but in modern torpedoes increased efficiency is obtained by supplying sufficient fuel to combine with the total amount of oxygen carried, obtaining the required cooling effect by the injection of water. Carbon dioxide or any inert gas in liquid form might be used for this purpose, or sufficient cooling effect might be obtained by supplying an excess of fuel.

In describing the apparatus illustrated in the drawings, the terms "air" and "water" will be used instead of the more general terms "oxygen carrier" and "cooling agent," although the operation of the apparatus is not dependent upon the use of these particular substances.

In order to obtain the maximum of efficiency the fuel, oxygen carrier and cooling agent should be supplied in fairly definite proportions which may be determined by experiment for any combination of substances employed, and these proportions are practically constant for any power and torpedo speed which may be developed under similar working conditions.

As the quantity of motive fluid which must be supplied per unit of time in any given case is dependent upon the power which it is desired to develop, the speed and power are obtained by regulations of the quantities of fuel, oxygen carrier and cooling agent supplied and consumed per unit of time. In turbine propelled torpedoes this regulation is accomplished, usually in the following manner:

Having selected a suitable working pressure, the total area of the turbine nozzles is fixed to suit the quantity of motive fluid supplied per unit of time.

The fuel and water are sprayed into the combustion chamber through parts of well-known construction, the orifices of which are adjusted to suit the quantities required per unit of time.

The flow of fuel and water is maintained by establishing a difference between the pressures in the combustion chamber and in the fuel and water compartments. The difference in pressure is obtained principally by the use of a restriction of suitable size, interposed in the air line between the combustion chamber and the point in the air line from which connection is made to the fuel and water containers.

As satisfactory turbine efficiency can be obtained only at high rotor speed, it is necessary to interpose a suitable gear reduction between the turbine and the propeller shafts.

The above adjustments constitute the power and speed setting of the torpedo, and in the case of torpedoes of the usual types, when once established, remain fixed with only slight variations for any design, change of adjustment being obtainable only by partial disassembly of the torpedo and substitution of parts. The torpedo, therefore, after being completely assembled, is capable of running, within narrow limits, at but a single speed.

By means of the mechanism herein illustrated and described all of the above adjustments may be simultaneously varied without disassembling the torpedo, the variations being so coordinated that proper regulation of the air, fuel and water supply is obtained for each of a definite number of power or speed settings. In the mechanism as illustrated provision is made for three settings although the mechanism without essential change of principles may be adapted to a greater or lesser number of settings.

By the rotation of a main setting shaft which will be hereinafter described in detail, the correct variation, to suit the position of the setting shaft as recorded on a suitable indicator, is effected simultaneously in each of the following factors affecting the power and speed of the torpedo:

(a) Total area of turbine nozzle ports.
(b) Area of restriction or orifice controlling supply of fuel.
(c) Area of restriction or orifice controlling supply of water.
(d) Area of restriction regulating differential pressure.
(e) Gear reduction.

Referring now to the drawings in detail, Figure 1, a main setting shaft 10 terminates in a bracket or bearing 11 attached to the shell of the torpedo through an opening in which the head of the shaft is accessible. By rotating this shaft as by means of a wrench or other suitable device adapted to engage a socket 12 formed in a head of the shaft, the desired adjustment may be made. A pointer is preferably carried by the head of the shaft to coact with suitable legends stamped on the exposed part of the mechanism but indicating the position of the setting of the shaft corresponding to the different speed settings. A spring actuated detent or plunger 13 is adapted to engage notches in the periphery of the shaft head and thus insures the accurate setting and maintaining of the shaft in its adjusted position.

Adjacent this shaft is the forward bulkhead 14 of the after-body and it is provided with a housing 15 containing a number of turbine nozzles 16 equal to or greater than the number of speed settings, the total nozzle port area being adequate to the maximum power developed at the highest speed setting. When the mechanism is set for lower speed, certain of these nozzles are blanked off in any desired manner but preferably by means of a nozzle valve 17 shown in detail in Figure 8 and raised and lowered by means of the rack 18 and the mechanism shown in Figure 7. The combined area of the nozzles which are open at each speed setting is proportioned or suitable to the power required for that speed. The movement of the nozzle valve is controlled by the rotation of the setting shaft 10 to which the valve is geared by means of rack 18 cut in the valve stem 20 and meshing with the idler gear 21, the gear 22 and the bevel gears 23 shown in Figure 1. The rack 18 is backed up by a roller 24 mounted on the supporting bulkhead in order to reduce the bending stresses in the valve stem and insure smooth operation.

Figure 4:
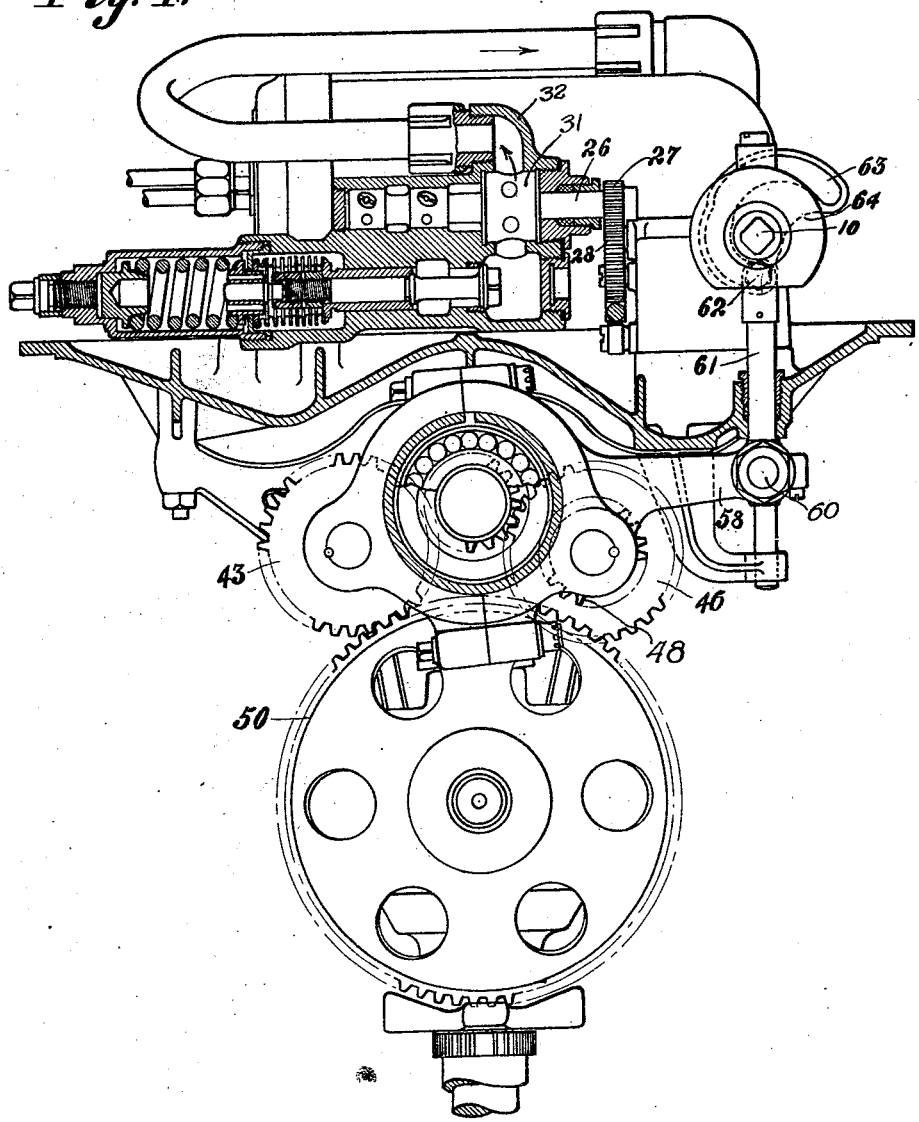
Figure 4 is a partial longitudinal sectional view of the mechanism shown in Figure 1 taken at right angles thereto.
Figure 5:
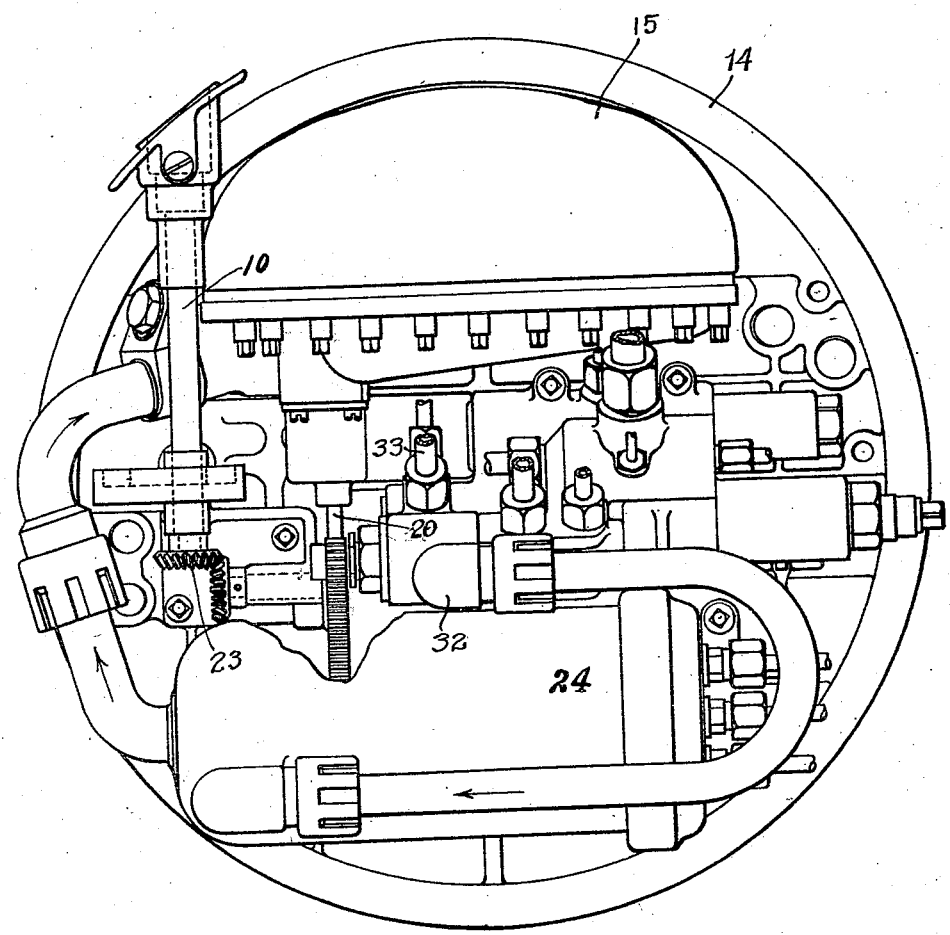
Figure 5 is a transverse elevational view taken just forward of the after-body bulkhead showing the setting and adjusting mechanisms for varying the speed of the torpedo.
Figure 6:
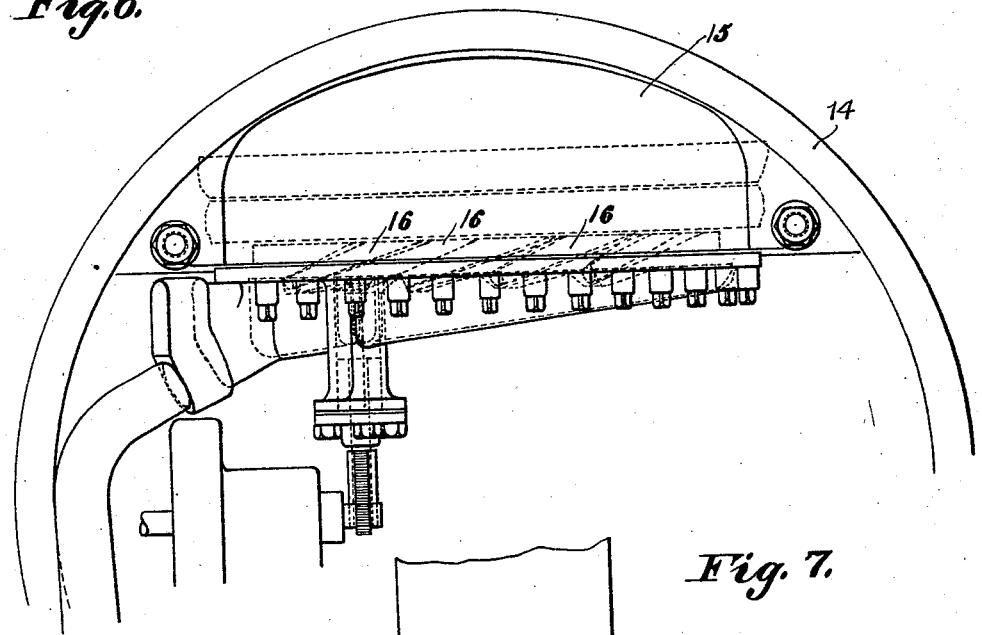
Figure 6 is a detail view showing the nozzle and means for controlling the same.

The quantities of fuel and water supplied to the combustion flask 24, Figure 5, to suit the power developed at the different speed settings are regulated by means of the rotary regulator valve 26 shown in Figure 4. The position of this valve is controlled by movement of the setting shaft 10 to which the regulator valve stem 26 is geared by means of gears 27 and 28 and bevel gears 23. Three sets of ports are provided on the valve stem 26 as shown in Figures 9, 10 and 11, the one set shown in Figure 9 being for fuel, another set shown in Figure 10 for water and the third set shown in Figure 11 for air. The number of ports in each set corresponds to the number of speed settings provided by the mechanism. The air ports, for instance, shown in Figure 11 are interposed in the air passage leading from the reduced pressure chamber of the reducing valve to the combustion flask, the air passing in the manner indicated by the arrows, that is, from the chamber 30 through the large port 31 and out through the port 32. A second air outlet 33 from the reduced pressure chamber communicates with the fuel and water reservoirs. The sizes of the ports shown in the rotary valve member are adjusted to suit the quantities of air delivered to the combustion flask at the different speed settings so that the drop in pressure of the air in passing through these restrictions and the air pipe to the combustion flask will be sufficient in all cases to insure a suitable difference in pressure between the combustion flask and the fuel and water reservoirs to maintain the continuous and uniform flow of the liquids through the regulator valve ports and into the combustion flask.

The sizes of the fuel and water ports or restrictions in the regulator valve are so adjusted to the differential pressure established for each speed setting that the proper quantities of the liquids required by the power developed at each speed setting will be delivered into the combustion flask.

The rotary valve members 34 and 35, shown in Figures 9 and 10 are mounted upon the same stem 26 and control the supply of fuel and water to the combustion flask.

Figure 2:
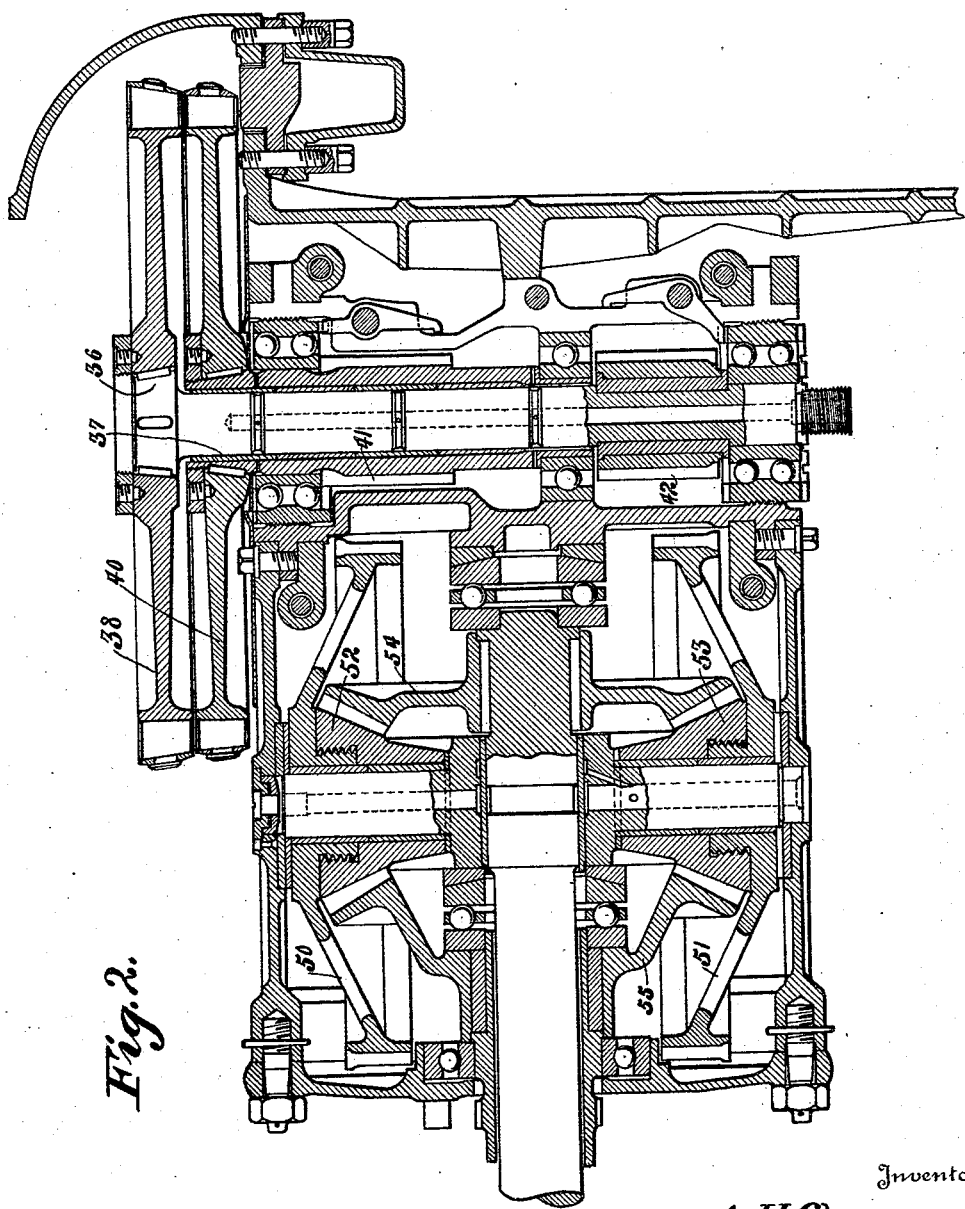
Figure 2 is a vertical sectional view of the parts shown in Figure 1.
Figure 3:
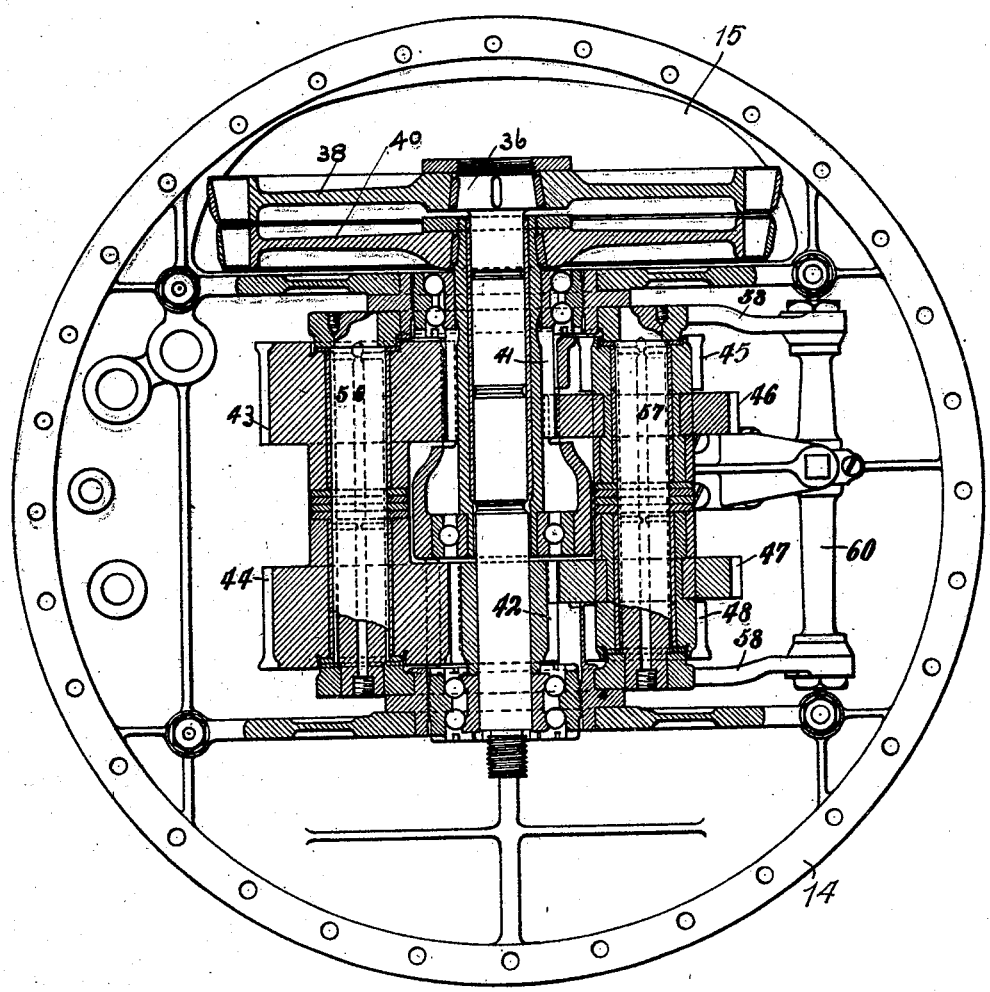
Figure 3 is a vertical transverse sectional view taken through the turbines and gearing shown in Figure 1.

The rotation of the turbine spindles 36 and 37 in Figure 2 by means of the turbines 38 and 40 respectively is communicated to the propeller shaft through a gear reduction train consisting of main driving pinions 41 and 42 on the outer and inner turbine spindles respectively, the side gears 43 and 44 or the opposite side gears 46, 47, Figure 3, meshing with the driving gears 41 and 42; the main driving gears 50 and 51; bevel pinions 52 and 53 rigidly secured to the driving gears 50 and 51 and the bevel gears 54 and 55 keyed to the inner and outer propeller shafts respectively. The side gears 43 and 44 as well as the gears 45, 46, 47 and 48 are mounted on spindles 56 and 57 carried by rockers 58 connected by rod 60 whereby they are free to rotate through a limited angle. The gears at one side or the other are adapted to mesh continuously with the main driving pinions 41 and 42 so that the peripheral speeds of these gears are equal. When the mechanism is adjusted to the high speed setting the rockers and side gears occupy the position shown in full lines in Figure 4, the main driving gears 50 and 51 being driven by the high speed side gears 43 and 44, Figure 3, at a peripheral speed equal to the peripheral speed of the driving pinions 41 and 42.

Each of the low speed side gears 45 and 46 as well as 47 and 48 consist of two sections securely fastened together. The sections of large diameter, that is, 46 and 47, mesh continuously with the driving pinions 41 and 42 and the sections of smaller diameter, that is, 45 and 48, mesh with the driving gears 50 and 51 when the mechanism is adjusted to the low speed setting. The main driving gears 50 and 51 are thus driven at a peripheral speed which is lower than the peripheral speed of the driving pinions 41 and 42 in the ratio of the pitch diameters of the small and large sections of the low speed side gears.

The rotation of the rockers 58 and 60 carrying therewith the side gears from the high to the low speed position and vice versa is accomplished by the movement of an operating rod 61, Figure 4, linked to the member 60 at one end, the opposite end carrying a roller 62 which engages a cam slot 63 cut in the face of a cam plate 64, the cam slot being so formed that the rotation of the setting shaft 10 controls the position of the side gears and rockers.

The teeth of the main driving gears 50 and 51 and the side gears coacting therewith are fitted with pointed extensions in order to guide the gears into mesh when rocked from high speed to low speed position and vice versa.

Although in the mechanism as illustrated three speed settings are provided, provision is made but for two gear reductions, the slot 63 in the cam plate 64 being so formed that the high speed position of the gears is retained for both the high and intermediate speeds. The turbine rotors will, therefore, run at full speed on the high and low speed settings but at reduced speed on the intermediate setting, the loss of efficiency resulting from the lower rotor speed at the intermediate setting being considered preferable to the increased complexity of the design which would result from three gear reductions.

The operation of the device is substantially as follows:—Assume the parts to be in the position shown in the drawings, that is, the entire mechanism set for a short high speed shot. If an intermediate speed shot of longer range is desired a wrench is applied to the socket 12 in the setting shaft 10 and the same is given a turn through substantially 90°. This setting or turning of the setting shaft does not affect the changed speed gearing due to the peculiar curvature of the cam slot 63 shown in Figure 4 but it will through the bevel gearing 23 and gearing shown in Figure 7 raise the nozzle valve therein from full open position to a midway position or, in other words, it will blank off three of the five nozzle ports, Fig. 8. Not only are a certain number of the turbine nozzle ports closed but the rates of flow of fuel, water and air are also varied by reason of the rotation of the valve shown in Figures 9, 10 and 11, therefore, inasmuch as less motive fluid is delivered to the turbines the torpedo will, with unchanged gear ratio consequently travel at a lesser speed but over a longer distance.

Figure 7:
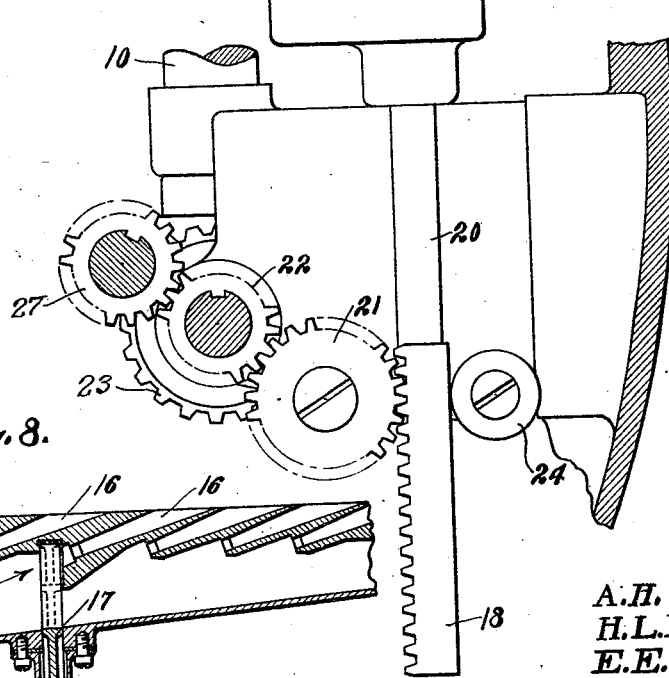
Figure 7 is a detail view of the nozzle regulated mechanism.
Figure 8:
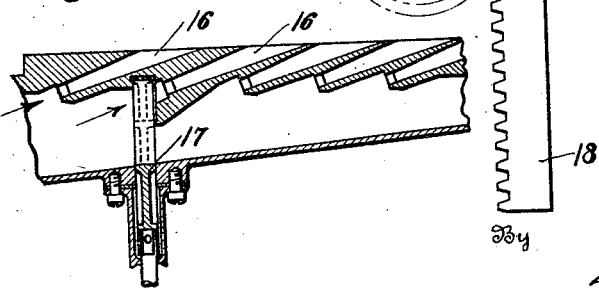
Figure 8 is a detail sectional view of part of the nozzle ports.

If an exceedingly long range low speed shot is desired the setting shaft 10 is rotated approximately 200° which will, through the gearing previously described and shown in Figure 7 further raise the nozzle valve 17 until all but one of the nozzles 16 are blanked off or closed. This same gearing will also rotate the valve mechanism shown in Figures 9, 10 and 11 to vary the amount of fuel, water and air respectively delivered to the combustion flask.

Furthermore, the cam slot 63 will coact with the roller 62 and actuate the rocker mechanism carrying the side gears whereby the high speed gears 43 and 44 shown in Figure 3 are carried out of mesh with the main driving gears 50 and 51 and the reducing gears 45 and 48 are brought into mesh with these driving gears 50 and 51, being driven by the intermediate gears 46 and 47 meshing with the main driving pinions 41 and 42.

In this manner the quantity of motive fluid delivered to the turbines is further reduced and a different speed ratio placed between the turbines and the propeller shafts thereby driving the torpedo at a much slower speed but over a much longer range, while retaining maximum turbine speed and consequently maximum turbine efficiency.

It will thus be seen that the present invention provides a reliable and efficient mechanism for easily and quickly setting the motive means of a torpedo to obtain any one of three desired speeds and ranges according to the particular use to which that torpedo is to be put, in fact, the invention is believed to accomplish, among others, all of the objects and advantages herein set forth in a simple and practical manner.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and, therefore, such adaptations should and are intended to be comprehended within the meaning and range of equivalency of the following claims.

What we claim is:—

1. In an apparatus of the character described, in combination, fluid operated motive means, means for regulating the flow of fuel thereto, a driven shaft connected with the motive means, a change speed gear interposed between the driven shaft and the motive means and a device for regulating the flow of fluid to change the speed of the driven shaft.

2. In an apparatus of the character described, in combination, fluid operated motive means, means for regulating the flow of fuel thereto, a driven shaft connected with the motive means, a change speed gear interposed between the driven shaft and the motive means, a device for regulating the flow of fluid to change the speed of the driven shaft and means operated simultaneously therewith for actuating the change speed gears.

3. In an apparatus of the character described, in combination, fluid operated motive means, means for regulating the flow of fuel thereto, a driven shaft connected with the motive means, a change speed gear interposed between the driven shaft and the motive means, a device for regulating the flow of fluid to change the speed of the driven shaft and means operated simultaneously therewith for actuating the change speed gears and reducing the flow of fluid to said motive means.

4. In an apparatus of the character described, in combination, a turbine having a plurality of nozzles for supplying fluid thereto, means for closing one or more of said nozzles as desired to restrict the flow of fluid, a driven shaft actuated by said turbine and a change speed gear interposed between the turbine and the driven shaft adapted to be actuated simultaneously with means for closing one or more of said nozzles and further retard the speed of the driven shaft.

5. A pair of turbines, a plurality of nozzle ports coacting with said turbines, a valve for closing one or more of said nozzle ports for the turbines as desired, a pair of driven shafts operated by said turbines, gearing for rotating said shafts in opposite directions and change speed gears interposed between said first mentioned shafts and the turbines whereby the rate of speed of the driven shafts may be regulated to one of two speeds.

6. A pair of turbines, a plurality of nozzle ports coacting with said turbines, a valve for closing one or more of said nozzle ports for the turbines as desired, a pair of driven shafts operated by said turbines, gearing for rotating said shafts in opposite directions, change speed gears interposed between said first mentioned shafts and the turbines whereby the rate of speed of the driven shafts may be regulated to one of two speeds and means operative simultaneously with the change speed gearing for modifying the flow of fluid through said nozzle ports to the turbines whereby a different speed is developed.

7. In a torpedo, in combination, multi-speed gearing comprising a pair of superimposed turbines having driving gears associated therewith, nozzle ports for supplying fluid to said turbines, a valve associated with said nozzle ports for closing one or more of the ports thereof as desired, shafts driven by the gearing associated with said turbines and change speed gear interposed between the driving gears and the shafts whereby change in speed of the driven shafts may be obtained.

8. In a torpedo, in combination, a pair of turbines having driving pinions associated therewith, nozzle ports for supplying motive means to said turbines, a pair of driven shafts, change speed gearing interposed between said pinions and said shafts and means actuated on actuation of said change speed gearing from a higher to a lower speed for restricting the flow of fluid means through said nozzle ports to the turbines whereby the rate of speed of the driven shafts is further reduced.

9. In a torpedo, in combination, a pair of turbines having driving pinions associated therewith, nozzle ports for supplying motive means to said turbines, a pair of driven shafts, change speed gearing interposed between said pinions and said shafts, means actuated on actuation of said change speed gearing from a higher to a lower speed for restricting the flow of fluid means through said nozzles to the turbines whereby the rate of speed of the driven shafts is reduced, said last mentioned means including a gate adapted to be moved across the path of flow of the fluid means in said nozzle.

10. In a torpedo, in combination, turbines having driving gears associated therewith, nozzle ports for conducting fluid means to said turbines, a setting shaft, valve means actuated by said setting shaft for blocking off one or more of said ports as desired whereby variations in speed of the torpedo may be obtained and change speed gearing adapted to be actuated simultaneously with a portion of the movement of said valve means whereby a further reduction in speed of the torpedo may be obtained.

11. In a torpedo, in combination, a setting shaft adapted to occupy a plurality of positions and means for holding said shaft in set position, a turbine, nozzles for conducting fluid means to said turbine, means for regulating the flow of fluid through said nozzles actuated by a movement of said setting shaft, driving gears associated with said turbines, driven shafts and intervening change speed mechanism adapted to be actuated as said setting shaft is moved from one position to another.

12. In a torpedo, in combination, a setting shaft adapted to occupy a plurality of positions and means for holding said shaft in set position, a turbine, nozzle ports for conducting fluid means to said turbine, valve mechanism for regulating the flow of fluid through said nozzles actuated by a movement of said setting shaft, driving gears associated with said turbines, and intervening change speed mechanism adapted to be actuated as said valve mechanism is given its final closing movement.

13. In a torpedo, in combination, a plurality of turbines having inner and outer driving shafts, inner and outer driven shafts, gearing associated with said driving and driven shafts, change speed gearing interposed between said driving and driven gears for regulating the speed of the driven shafts and nozzles associated with said turbines, each having a plurality of ports and means actuated on actuation of said change speed gearing for restricting the flow of fluid means through said nozzles to said turbines.

Signed at Washington, District of Columbia, this 5th day of January, 1922.

ARTHUR HUTCHINSON CHASE.
HARRY LUTHER BOESCH.
ERNEST EDWARD HOLBROOK.